United States Patent [19]
Billet et al.

[11] Patent Number: 4,600,092
[45] Date of Patent: Jul. 15, 1986

[54] CLUTCH COVER AND FLYWHEEL SECUREMENT ASSEMBLY

[75] Inventors: René Billet, Lamorlaye; Michel Bacher, Garges-les-Gonesse, both of France

[73] Assignee: Valeo, Paris, France

[21] Appl. No.: 489,534

[22] Filed: Apr. 28, 1983

[30] Foreign Application Priority Data

Apr. 29, 1982 [FR] France .................. 82 07392

[51] Int. Cl.[4] .................................. F16D 13/58
[52] U.S. Cl. .......................... 192/70.11; 192/89 B
[58] Field of Search ........... 192/70.11, 70.13, 70.28, 192/70.14, 70.16, 70.19, 70.21, 70.22, 70.27, 89 B, 110 B, 110 R, 109 R, 98, 112; 285/382; 403/335, 336, 338

[56] References Cited

U.S. PATENT DOCUMENTS

| | | | |
|---|---|---|---|
| 1,934,850 | 11/1933 | Fromaget | 192/70.28 |
| 2,270,926 | 1/1942 | Briegel et al. | 285/382 |
| 2,296,538 | 9/1942 | Reed | 192/70.13 |
| 3,128,639 | 4/1964 | Hein et al. | 74/572 |
| 4,327,951 | 5/1982 | Arrowsmith | 192/110 B |
| 4,357,990 | 11/1982 | Melnyk | 285/382 |

FOREIGN PATENT DOCUMENTS

| | | |
|---|---|---|
| 1963157 | 6/1971 | Fed. Rep. of Germany .... 192/89 B |
| 1461845 | 12/1966 | France . |
| 2070392 | 9/1971 | France . |
| 2455212 | 11/1980 | France . |
| 552952 | 4/1943 | United Kingdom . |

*Primary Examiner*—George H. Krizmanich
*Attorney, Agent, or Firm*—Charles E. Brown; Charles A. Brown

[57] ABSTRACT

An automotive clutch comprises a flywheel fixed to a driving shaft, a friction disc fixed for a rotation with a driven shaft, a pressure plate fixed for rotation and axially movable with respect to the flywheel and a diaphragm spring bearing against a fulcrum on the cover for urging the pressure plate towards the flywheel axially clamping the clutch disc. Precision centering and securement of the cover on the flywheel are provided by machining a recess in the skirt of the cover in precision fitting relation with the cylindrical periphery and a faced annular surface on the flywheel and crimping the skirt to the flywheel. The precision centering of the cover ensures the centering of components such as starter ring gear.

14 Claims, 6 Drawing Figures

CLUTCH COVER AND FLYWHEEL SECUREMENT ASSEMBLY

BACKGROUND OF THE INVENTION

The present invention relates to clutches and particularly automotive clutches.

The present invention relates more particularly to automotive clutches of the kind comprising, in axial succession, a reaction plate or flywheel adapted to be secured by fastening means to a first shaft which in practice is the driving shaft, a clutch disc or plate adapted to be fixed for rotation with a second shaft which in practice is a driven shaft, a pressure plate fixed for rotation with the reaction plate though axially movable with respect to the reaction plate, a cover axially fixed to the reaction plate, and rotatable therewith, and resilient means bearing against the cover and constantly biasing the pressure plate toward the reaction plate for axially clamping or squeezing the clutch plate between the pressure plate and the reaction plate.

In this kind of clutch the operation of which is well known, the entire clutch assembly is rotatable, and outside relatively brief periods when the driving and driven shafts are operatively disconnected by axially releasing the pressure plate by deformation of the resilient means, rotates at the speed of rotation of the driving shaft. In present-day internal combustion engines this speed commonly exceeds 100 r.p.m. or 315 radians per second. The corresponding centrifugal acceleration is 100 g at 1 centimeter from the axis. It is clear that taking into account that the entire clutch assembly rotates, the centering and the balancing of the clutch assembly are extremely important for the proper operation and reliability of clutch assembly.

Moreover, the entire active mechanism of the clutch is located in an enclosed space defined between the reaction plate and the cover. Owing to the location of the clutch plate between the reaction plate and the pressure plate and the fixing of the pressure plate for rotation with the driven shaft, the fixing of the pressure plate for rotation with and axial movement with respect to the reaction plate is necessarily effected along the outer periphery beyond the outer diameter of the clutch plate.

Such a clutch is assembled on a jig comprising two coaxial mandrels axially displaceable with respect to each other. One mandrel receives the reaction plate and the other the cover. The clutch plate and the resilient means such as a diaphragm spring are mounted on centering bridges while the pressure plate is centered from the exterior. Thereafter the mandrels are moved toward each other to fix the cover on the reaction plate, thereby preloading the resilient means. The securement of the cover on the reaction plate and the axially mobile connection between the pressure plate and the reaction plate are determinative for the balancing of the clutch. Nevertheless, it is generally necessary to refine the balance by controlled local removal of stock.

It is evident that the general reference axis of the clutch is the axis of the driving shaft. However, this reference is not available at the time the clutch is assembled. Also, the reaction plate undergoes a close tolerance machining operation for coupling, which defines a secondary axial reference for the assembly of the clutch, all the components being centered with respect to this secondary reference.

Conventionally the cover is assembled with the reaction plate by connecting an outer radial rim of the cover on a faced surface of the reaction plate by fastening means such as screws. Now, the cover which is generally dish-shaped with a central opening is stamped from a sheet metal blank. The rim is edged and its surface that comes into contact with the reaction plate is faced. Yet these operations, like the mounting on the mandrel of the assembly jig, are executed with the cover gripped in a chuck jaw, whose outer surface is substantially as it comes from the stamping operation. Because of finishing operations the centering tolerances are necessarily large. The influence of such large centering tolerances on the cover for the balance of the assembled clutch is not serious, and is easily compensated for by the final balancing operation. But it is out of the question to use the cover as a reference for the centering of the other components of the clutch.

Now, the rationalization of the structure of the clutch or the adaptation of the clutch to a particular type of engine may make it desirable to fix such other components on the cover. In particular when the pressure plate is fixed for rotation with the reaction plate by straps fixed to lugs on the pressure plate which protrude through cutouts in the sidewall of the cover, which straps are anchored on spacer members riveted to the cover. Thus the centering of the pressure plate is maintained by the straps for which the cover does not provide a centering reference.

SUMMARY OF THE INVENTION

An object of the invention is to provide a clutch of the kind defined above where the precise centering of the cover is ensured at the time of assembly.

Another object of the invention consists in a clutch of this kind in which the component parts of the clutch are fixed to the cover.

Yet another object of the invention is the provision of a clutch of this kind the assembly of which is simplified.

According to the invention there is provided a clutch in particular for a motor vehicle of the kind comprising in axial succession a reaction plate or flywheel adapted to be fixed to a first shaft, which in practice is the driving shaft, a clutch plate adapted to be fixed for rotation to a second shaft, which in practice is the driven shaft. Then comes a pressure plate fixed for rotation with the reaction plate while being axially movable with respect to the reaction plate, which is followed by a cover axially fixed to the reaction plate for rotation therewith. Resilient means bearing against the cover constantly bias the pressure plate toward the reaction plate for axially clamping or squeezing the clutch plate between the pressure plate and the reaction plate. The clutch is characterized by a part of the reaction plate having a cylindrical peripheral surface bordered at least along the inner side of the reaction plate by a faced planar annular bearing surface, the cover having a skirt defining a recess with the faced inner surfaces thereof fitting with the annular bearing surface and the cylindrical peripheral surface of the reaction plate.

It is known that the fits with a cylindrical surface and a planar surface are capable of providing excellent precision without complex machining processes. This ensures that upon assembly the axis of the cover as defined by the machining of the planar surface and the cylindrical surface in the recess in the skirt will coincide with the axis of the reaction plate as defined by the machining of the cylindrical peripheral surface and the planar annular bearing surface of the reaction plate. Of course the distance between the fulcrums provided for the resilient means on the end wall of the cover and on the outer surface of the reaction plate is also well defined. If the bearing surfaces for the components of the clutch are machined on the cover either when the cover is mounted on a machine tool for machining the inner surfaces of the recess, or possibly for finishing machining by using the recess as a reference, this will practically insure that the components mounted on the cover will not have any eccentricity or want of balance when they are mounted on the reaction plate.

Preferably zones of the skirt are crimped to the reaction plate. The crimping is carried out in a single operation while the clutch is in the assembly jig.

French patent publication No. 2,455,212 discloses a dual clutch with a decoupling mechanism between the driving shaft and the flywheel in front of a more conventional clutch between the flywheel and the driven shaft. This clutch is provided to permit the stopping of the engine when the rolling under its own speed or at a standstill for a short period of time, the kinetic energy stored by the flywheel permitting the restarting of the engine by releasing the decoupling mechanism. The decoupling mechanism comprises a drive plate fixed to the driving shaft clamped between the two pressure plates one of which is axially movable inside the a cup-shaped cage journalled along the axis of the driving shaft while the other pressure plate is nested in a recess in the cage and retained therein by a weld or by a securing means defined by a crimp.

It is noteworthy that in French patent publication No. 2,455,212 retention of the pressure plate in a recess in the cage by a crimp which moreover is an assembly means known per se, does not correspond to the structure or the function of the arrangement of the present invention. The recess is machined in a tubular part of the cage substantially diminishing the thickness of the sidewall. On the other hand the recess does not have a reference function for the centering of the components of the clutch other than the pressure plate and the cage.

According to a first embodiment the periphery of the reaction plate has depressions in which strikes in the corresponding periphery of the skirt are driven.

Alternatively the skirt may extend axially beyond the reaction plate at least along part of the periphery and be bent over against the outer side of the reaction plate axially remote from the clutch plate. In particular the skirt may comprise spaced projections which form bentover lugs or tabs.

According to a preferred feature a starter ring gear is secured to the clutch cover or on the outer surface of the reaction plate.

The features and advantages of the invention will become apparent from the description which follows, given by way of example, with reference to the accompanying drawings.

DESCRIPTION OF THE PREFERRED EMBODIMENTS

Figure 1:
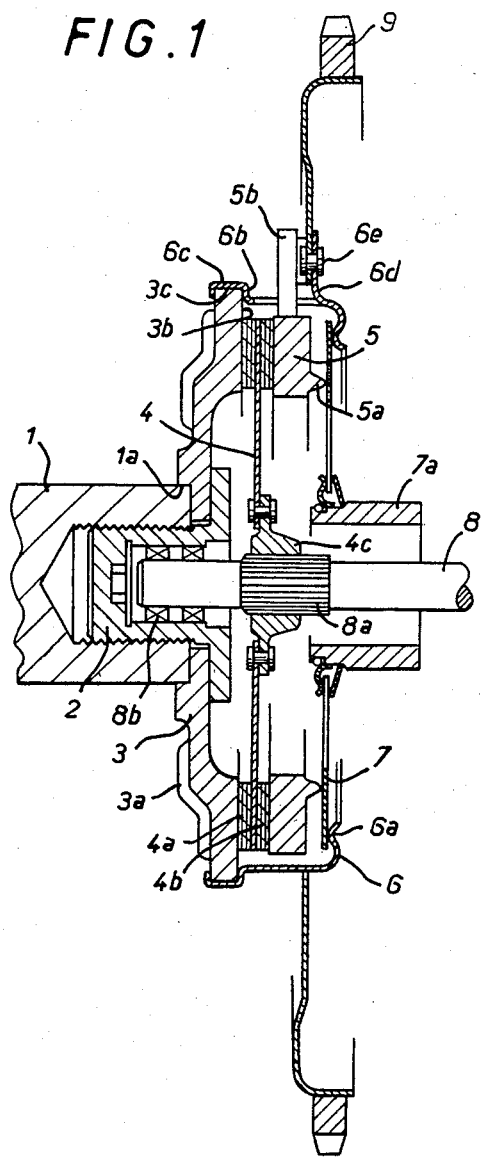
FIG. 1 shows a diagrammatic sectional view of a clutch embodying the present invention.

In the embodiment illustrated in FIG. 1 the clutch comprises a reaction plate or flywheel 3 which is fixed for rotation with a first shaft 1, which in practice is the driving shaft 1, by fastening means 2 which comprise a single threaded fastener having a threaded shank and a radial flange or head at one end thereof. The end 1a the driving shaft 1 is in interference fit in a recess in reaction plate 3 to ensure excellent coaxiality of the shaft 1 and the reaction plate 3. The reaction plate 3 comprises on its outer side (with respect to the entire clutch) cooling fins 3a and an annular inner surface 3b which is faced plane and perpendicular to the axis of rotation of the clutch. The reaction plate 3 has an outer peripheral cylindrical surface 3c which is centered with precision along the clutch axis. It will be noted that faced inner annular surface 3b and the cylindrical surface 3c may be turned on a lathe.

A facing 4a of the clutch plate or friction disc 4 engages the inner annular surface 3b and facing 4b of the opposite side of the clutch plate 4 engages a pressure plate 5. The clutch plate 4 comprises a splined hub 4c which is received on complementary splines 8a on a second shaft 8 which in practice is the driven shaft. The driven shaft 8 is centered by bearings 8b coaxial with the driving shaft 1.

The generally ring-shaped pressure plate 5 has on its surface remote from the surface which bears against facing 4a, an annular bead 5a which defines a fulcrum for a diaphragm spring 7 which biases the pressure plate 5 toward the reaction plate 3. The diaphragm spring 6 also bears against an annular bead 6a stamped in the cover 6 which defines the fulcrum on the other side of the diaphragm spring 7. The skirt 6b, 6c of the cover 6 is fitted on the outer periphery of the reaction plate as will be described in greater detail below. A clutch release bearing 7a is received in the central opening of the diaphragm spring 7 and coupled thereto in a manner known per se to operate the diaphragm spring by pulling the latter which in turn relieves the biasing force otherwise exerted by the diaphragm spring 7 against the bead 5a on the pressure plate 5 and thereby frees the clutch plate 4 and disengages the clutch.

The cover 6 comprises an outer periphery divided into two regularly spaced zones with cutouts for permitting the passage of the three lugs 5b projecting outwardly from the pressure plate 5. Resilient straps (not shown) are fixed to the lugs 5b at one of their ends and riveted at 6e to lugs 6d radially outwardly from the cutouts in the sidewall of the cover 6. It will be understood that the resilient straps fix the pressure plate 5 for rotation with the cover 6 while permitting axial displacement of the pressure plate during clutch operation and also center the pressure plate 5 relative to the cover 6.

Figure 2A:
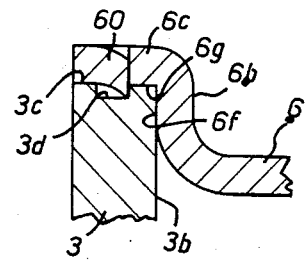
FIGS. 2A, 2B and 2C illustrate various methods of crimping the cover on the reaction plate.
Figure 2B:
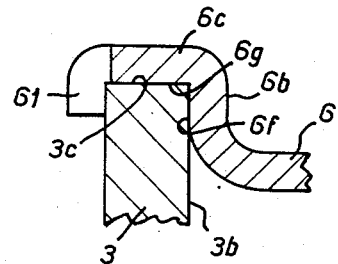
Figure 2C:
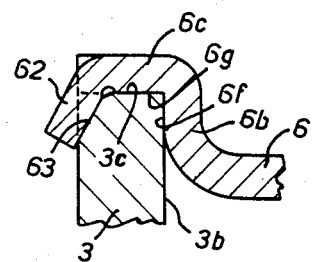

As will be better seen in FIGS. 2A-2C, the skirt of the cover 6 which is fitted on the periphery of the reaction plate comprises a radially outwardly extending wall portion 6b followed by a cylindrical ring portion 6c. The inner surfaces 6f and 6g of the wall portion 6b and the ring portion 6c, respectively, are machined, surface 6f being faced and surface 6g being reamed, with precision for fitting on the faced annular rearing surface 3b and the cylindrical peripheral surface 3c of the reaction plate 3. Obviously, inner surface 6f is parallel to the plane of the bead 6a. The machining of the surfaces 6f and 6g may be followed, without removing the cover, by the machining of the lugs 6d.

Accordingly the skirt comprising the radial wall portion 6b and the cylindrical ring portion 6c defines a radially outwardly projecting recess having inner surfaces 6f and 6g.

For the assembly of the clutch the reaction plate 3, the clutch plate 4, and the pressure plate 5 and the diaphragm spring 7 are normally centered on the same mandrel of the jig (not shown) whereas the cover 6 is received on another mandrel with slight radial clearance so that the cover will be centered when fitted on the reaction plate 3.

When the assembly is correctly carried out the planar surface 6f of the recess being in engagement with the bearing surface 3b along the entire periphery, the cylindrical ring portion 6c of the skirt is deformed at selected locations along the periphery for effecting the rotational connection and irreversible and nondeformable axial connection between the reaction plate 3 and the cover 6. As illustrated in FIG. 2A the reaction plate 3 comprises depressions along its cylindrical peripheral surface 3c which are grooves 3d in this embodiment extending along the peripheral surface and the cylindrical wall portion 6c of the skirt has a strike 60 which is engagement in the groove 3d.

According to the embodiment of FIG. 2B the cylindrical wall portion 6c of the skirt is extended by tabs 61 which are folded over the outer side of the reaction plate 3.

In the embodiment of FIG. 2C the reaction plate 3 comprises oblique notches 63 or a conical bearing surface in the solid angle included between the cylindrical peripheral surface 3c and the outer side. The tabs 62 which have a root section located in a plane intermediate the inner and outer sides of the reaction plate 3 are folded into the oblique notches 63 or the conical bearing surface. It will be noted that this arrangement provides perfectly satisfactory fixing of the cover 6 for rotation with the reaction plate 3 even when transmitting high torque.

In all cases once the clutch is assembled it is secured to the driving shaft 1 by fastening means 2.

In the embodiment illustrated in FIG. 1 it will be recalled there is a single threaded fastener which is axially operative and which has a hexagonal socket which is accessible from the exterior through the clutch disc 4, the pressure plate 5 and the cover 6. Obviously this threaded fastener is secured into place in the clutch before the assembly of the component parts of the clutch.

Returning to the FIG. 1 it will be seen that a starter ring gear 9 is fixed on the lugs 6d bent out from the cover, welded on a support web or ring 9a which is fixed to the lugs 6d by rivets 6e. It will be understood that the additional machining of the support web 9a and the lugs 6d ensures the coaxial mounting of the starter ring gear 9 on the clutch, the machining of the lugs 6d being executed together with the recess in the cover.

Figure 3:
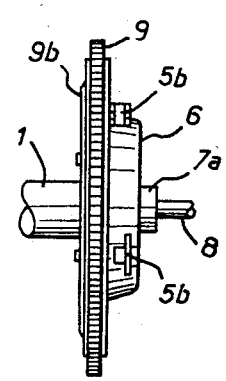
FIG. 3 show a side view of another embodiment of the clutch according to the invention.

As seen in FIG. 3 the starter ring gear 9 may also be fixed by the medium of a stamped support web 9b on the outer side of the reaction plate 3. Obviously the outer side of the reaction plate 3 will have to be configured and machined accordingly.

Of course the novel clutch is not intended to be limited to the illustrated and described embodiments but encompasses all modifications and alternatives understood to those skilled in the art without departing from the spirit and scope of the invention. In particular such is the case with all of the components of the clutch which do not directly affect the mounting of the cover on the reaction plate and other methods of deforming the cover for crimping it on the reaction plate may be provided.

Further, the present invention is equally applicable to clutches in which the reaction plate or flywheel is of one piece construction and clutches in which the reaction plate or flywheel comprises at least two parts or half flywheels, the subassembly comprised of a half flywheel and the cover assembly between which the clutch plate is squeezed or clamped being mounted on the other half flywheel.

Figure 4:
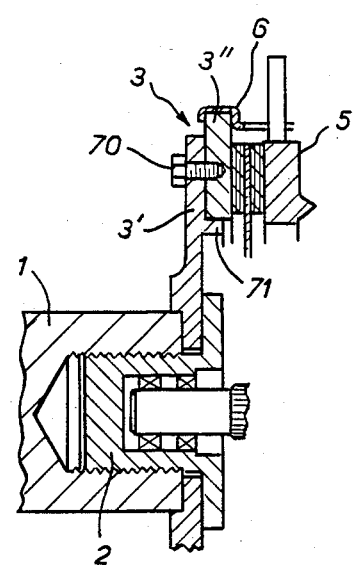
FIG. 4 is a partial sectional view similar to that of FIG. 1 relative to a modified embodiment.

This possibility is illustrated in FIG. 4. The reaction plate 3 is in two parts 3',3" fixed to each other by threaded fasteners 70. Part 3" is fixed to the cover 6 according to any of the embodiments illustrated in FIGS. 2A, 2B or 2C. Part 3' which has a centering bridge 71 for centering part 3" is previously fixed to the end of the driving shaft 1 by threaded fasteners 2 which facilitates the handling of the same; the clutch per se, with part 3" is secured to part 3' afterwards by threaded fasteners 70.

Thus only a part of the reaction plate, namely part 3" which is directly involved in the assembly of the cover 6 to the reaction plate according to the invention.

What is claimed is:

1. A clutch for a motor vehicle comprising, in axial succession, a reaction plate, means for fixing said reaction plates for rotation with a first shaft, a clutch plate, means for fixing said cultch plate for rotation with a second shaft, a pressure plate fixed for rotation with and axially movable with respect to said reaction plate, a clutch cover axially fixed to said reaction plate for rotation therewith, resilient means bearing against said cover and constantly urging said pressure plate toward said reaction plate for sequeezing or clamping said clutch plate therebetween, the improvement wherein said reaction plate has a cylindrical peripheral surface and a planar annular bearing surface for engagement with said clutch plate adjoining said cylindrical peripheral surface, said cover having a skirt defining a recess for receiving the peripheral portion of said reaction plate, said skirt having a crimped zone crimping it to said reaction plate, said recess having a machined planar surface fittingly engaged with said annular bearing surface and a machined cylindrical surface fittingly engaged with said cylindrical peripheral surface of said reaction plate, for precision centering of said cover on said reaction plate.

2. The clutch of claim 1, wherein depressions are formed in the cylindrical peripheral surface of said reaction plate, crimped zones on said skirt protruding obliquely into respective depressions for crimping said skirt to said reaction plate.

3. The clutch of claim 1, said reaction plate having another surface opposite said annular bearing surface facing away from said clutch plate, at least part of the periphery of said skirt extending beyond said cylindrical peripheral surface of said reaction plate and bearing against said other surface.

4. The clutch of claim 3, wherein said part of said periphery of said skirt comprises circumferentially spaced inwardly bent tabs.

5. The clutch of claim 1, wherein a starter ring gear is carried on a support secured to said cover and on said cover.

6. The clutch of claim 1, wherein a starter ring gear is carried on a support secured to the side of said reaction plate axially remote from clutch plate.

7. The clutch of claim 1, wherein said recess and said reaction plate peripheral portion define an interference fit.

8. The clutch of claim 7, wherein said skirt has a deformed portion axially fixing said cover on said reaction plate.

9. The clutch of claim 8, wherein said deformed portion applies an axial force component maintaining said annular bearing surface in contact with said planar surface of said recess.

10. The clutch of claim 9, wherein said deformed portion bears against an at least partly transverse zone on said reaction plate peripheral portion.

11. The clutch of claim 7, wherein said skirt is crimped on said reaction plate for axially fixing said cover to said reaction plate.

12. The clutch according to claim 1, said recess opening radially inwardly and said crimped portion defining axial abutment preventing relative axial movement of said reaction plate and said cover in the axial direction opposite to that precluded by said planar surface and said annular bearing surface.

13. The clutch according to claim 1, wherein the part of the cover sidewall including said recess has a wall thickness substantially the same as that of the adjoining part of the cover sidewall.

14. The clutch of claim 4, wherein said reaction plate has circumferentially spaced axial grooves with oblique radially inwardly directed terminal zones for receiving complementary axial portions and oblique portions of said tabs.

* * * * *